United States Patent
Wang

(10) Patent No.: US 7,213,140 B2
(45) Date of Patent: May 1, 2007

(54) METHOD FOR SELF-STARTING A COMPUTER

(75) Inventor: Li-Chyn Wang, Taipei (TW)

(73) Assignee: Micro-Star Int'l Co., Ltd., Jung-He, Taipei Hsien (TW)

( * ) Notice: Subject to any disclaimer, the term of this patent is extended or adjusted under 35 U.S.C. 154(b) by 398 days.

(21) Appl. No.: 10/605,837

(22) Filed: Oct. 30, 2003

(65) Prior Publication Data

US 2005/0097307 A1    May 5, 2005

(51) Int. Cl.
    *G06F 15/177* (2006.01)
(52) U.S. Cl. .................. 713/1; 368/10; 368/28
(58) Field of Classification Search .......... 713/1; 368/10, 28
    See application file for complete search history.

(56) References Cited

U.S. PATENT DOCUMENTS

| | | | | |
|---|---|---|---|---|
| 4,951,171 A * | 8/1990 | Tran et al. | .................. | 361/90 |
| 5,224,010 A * | 6/1993 | Tran et al. | .................. | 361/90 |
| 5,995,454 A * | 11/1999 | Yamaki | .................. | 368/10 |
| 6,052,779 A * | 4/2000 | Jackson et al. | .................. | 713/2 |
| 6,134,187 A * | 10/2000 | Tomiyasu | .................. | 368/28 |
| 6,574,577 B2 * | 6/2003 | Stapleton et al. | .................. | 702/117 |
| 6,792,553 B2 * | 9/2004 | Mar et al. | .................. | 713/330 |
| 6,845,415 B2 * | 1/2005 | Chen et al. | .................. | 710/72 |
| 2001/0049794 A1 * | 12/2001 | Chen | .................. | 713/200 |
| 2003/0074592 A1 * | 4/2003 | Hasegawa | .................. | 713/324 |
| 2003/0095044 A1 * | 5/2003 | Lin et al. | .................. | 340/568.2 |
| 2003/0097587 A1 * | 5/2003 | Gulick | .................. | 713/200 |
| 2003/0126251 A1 | 7/2003 | Chen et al. | | |
| 2003/0221093 A1 * | 11/2003 | Touchet | .................. | 713/1 |
| 2004/0064747 A1 * | 4/2004 | Haider | .................. | 713/330 |

* cited by examiner

*Primary Examiner*—Thomas Lee
*Assistant Examiner*—Vincent Tran
(74) *Attorney, Agent, or Firm*—Winston Hsu

(57) ABSTRACT

According to the claimed invention, a computer is disclosed. The computer comprises a first memory for storing a BIOS, a clock for tracking time, a second memory for storing the time value of the clock and an alarm setting based upon a predetermined time selected by a user, a communication management circuit for controlling peripheral memory buses, and a power supply for providing electrical power to the computer.

7 Claims, 2 Drawing Sheets

METHOD FOR SELF-STARTING A COMPUTER

BACKGROUND OF INVENTION

1. Field of the Invention

The invention relates to self-starting a computer, and more particularly, to the use of a BIOS to self-start a computer.

2. Description of the Prior Art

The role of the personal computer (PC) has undergone a dramatic change since its introduction circa 1980. In the beginning, the PC occupied a small niche in daily life; it was only an integral part of life for those people who understood esoteric command-line interfaces (e.g. DOS). The PC was not a major part of most peoples lives because the cryptic command-line interface combined with the dearth and limited ability of software available at that time made the computer rather difficult to use and understand. As a result, people only wanted to interact with the computer when they needed to do their work.

However, as technology advanced and computers became more sophisticated, the role of the computer began to change. With the ability to process more information at one time, the interface of the computer changed from command-line (e.g. DOS) to graphic-based (Windows); users no longer had to memorize commands but could now "point and click" their way through using a mouse. In addition, the ability to process more information brought about increased functionality in existing software. For example, word processing software added the ability to insert graphs, pictures, and spread sheets. Finally, being able to process more information meant that the PC could add extra features such as playing DVDs, setting up hardware automatically for users (e.g. Plug N Play), experiencing a multimedia internet, etc. Essentially, the ability to process more information made the computer easier to use, furthered the ability of existing software, and offered more features. Because of all these things, the PC has seen its role of a seldom-used work tool relegated to the corner of a room transform into an often-used work/entertainment center.

Due to the PCs role transformation, a new user need has been created the need for the computer to be able to self-start from an off state. Before the transformation, there was no need for such ability. Most software required the user to be present to run the software; nothing could be accomplished without the user. Examples of such software include word processing, spread sheets, graphing programs, etc. In summary, the pre-transformation software required users to sit at the computer to input data for the purpose of doing work. The tasks that users wanted to do could not be done while the user was away.

However, current technology allows for the automation of many processes; the computer can run software independent of the user. In addition, much of the software that allows for automation was simply not possible before the PCs transformation. That is to say, other types of software besides data entry appeared. Giving the computer the ability to self-start from an off state would greatly enhance the utility of such software.

For example, one such software that would benefit is a content recording program for a PC, content being things such as television program, radio music, etc. By adding the ability to self-start from an off state, the user can set a time in the program to begin recording the content and then turn off the computer. The computer could then self-start at the set time and begin recording. Another example is that office computers could come equipped with software that allows users to select a time to self-start. Workers could then select a time in the morning so that the computer will have booted by the time they arrive at work. One more example could be the scheduling of utilities such as virus scans, hard disk defragmentation. The user can select a time for the computer to self-start and conduct one of the mentioned utility operations.

Despite the need for the ability to self-start, the prior art does not offer any solutions. Currently, the only way to start a computer is to have a user push the power on button. Obviously, having to push the power button is inadequate for the user need described above.

SUMMARY OF INVENTION

It is therefore a primary objective of the claimed invention to provide a BIOS capable of establishing a pathway from a memory to a communication management circuit to solve the above-mentioned problem.

According to the claimed invention, a computer is disclosed. The computer comprises a first memory for storing a BIOS, a clock for tracking time, a second memory for storing the time value of the clock and an alarm setting based upon a predetermined time selected by a user, a communication management circuit for controlling peripheral memory buses, and a power supply for providing electrical power to the computer.

It is advantageous to employ a BIOS capable of establishing a pathway from the second memory to the communication management circuit. When the computer is off and a match between the clock and the alarm setting is made, the second memory sends a signal to the communication management circuit. In response to the sent signal, the communication management circuit sends a "power on" signal along the pathway established by the employed BIOS to the power supply in the computer, resulting in the self-start of the computer.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
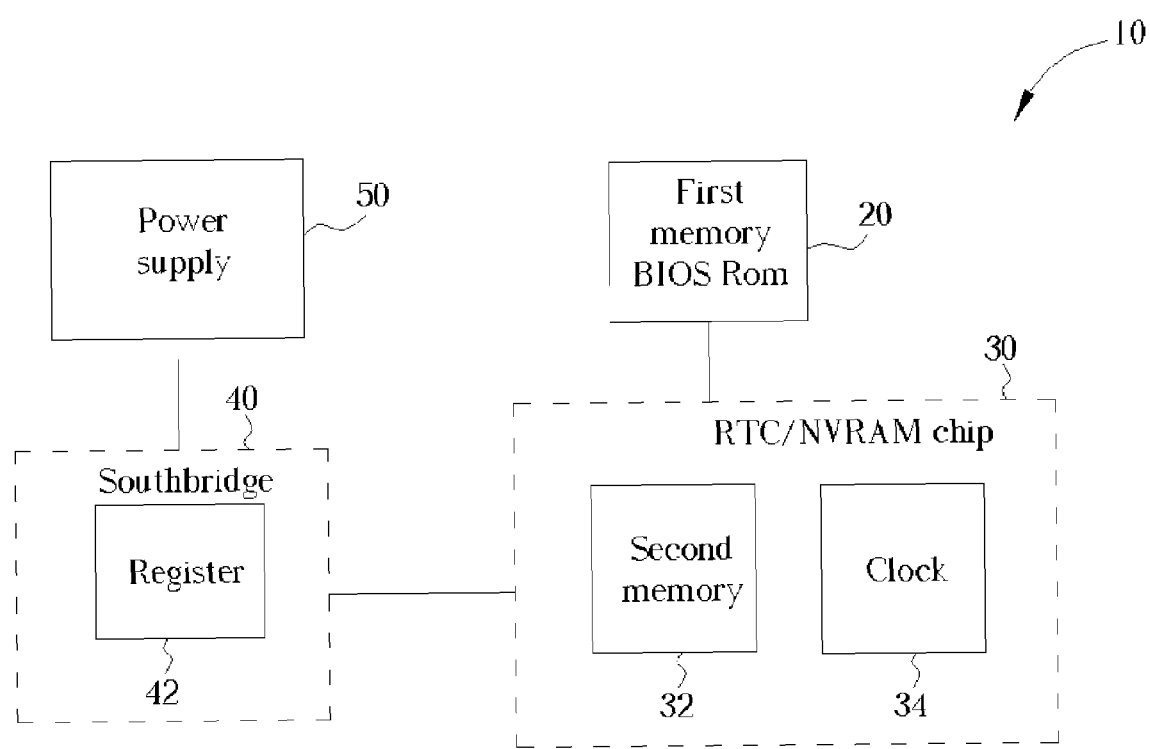
FIG. 1 is a diagram of a computer according to the present invention.

Please refer to FIG. 1. FIG. 1 is a diagram of a computer 10 according to the present invention. In this preferred embodiment, the computer 10 comprises a first memory 20, a second memory 32, a clock 34, a communication management chip 40, and a power supply 50. The second memory 32 is for storing an alarm setting and sending a matching signal while the clock 34 is for tracking time. The communication management chip 40 is for sending a power on signal and comprises a register 42 for storing an SCI (System Control Interrupt) bit that allows the communication management chip 40 to respond to the matching signal sent from the second memory 32. The first memory 20 is for storing a BIOS (Basic Input/Output System) capable of establishing a pathway from the second memory 32 to the communication management chip 40 for which the matching signal can be sent along. Finally, the power supply 50 is for supplying the computer with electrical power.

In a preferred embodiment, the first memory 20 is realized by a ROM (Read Only Memory) chip, sometimes referred to only as the BIOS. The second memory 32 and the clock 34 are placed on the same chip and as a result are realized in the form of one chip known as the RTC/NVRAM (Real Time Clock/Non Volatile Memory) chip 30. The RTC/NVRAM chip 30 is more popularly referred to as the CMOS (Complementary Metal Oxide Semiconductor) chip because the second memory 32 is often made using CMOS technology. Finally, the communication management chip 40 is realized by a Southbridge chipset on the mother-board. The register 42 of the Southbridge chipset 40 is used to store an SCI bit, and information from this SCI bit is sent using an associated SCI pin also located on the Southbridge chipset 40.

Figure 2:
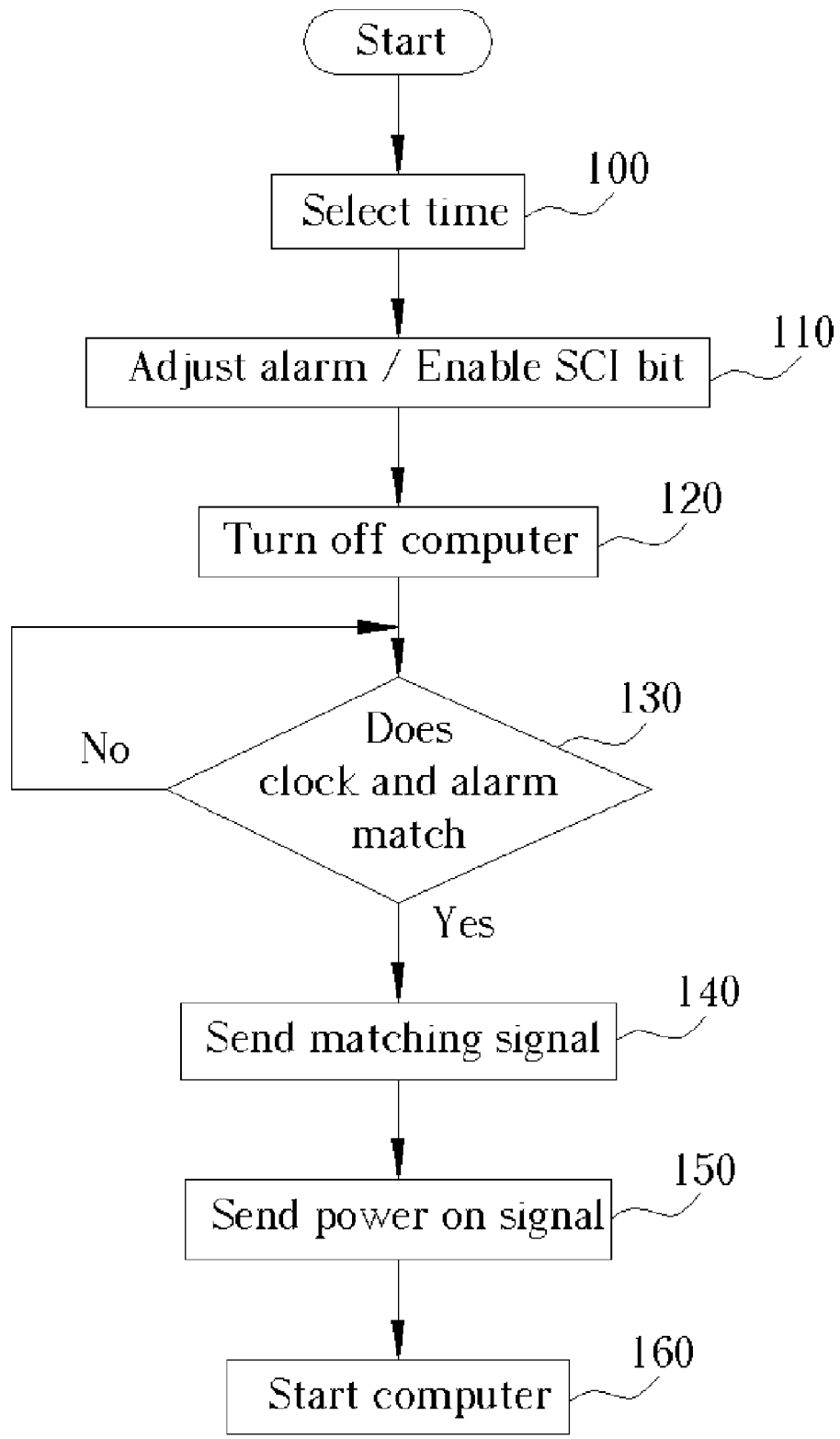
FIG. 2 is a flowchart of the operations of a computer according to the present invention.

Please refer to FIG. 2. FIG. 2 is a flowchart of the operations employed by the computer 10 to self-start.

Step 100: Select a time via an OS (Operating System) application. The computer 10 will self-start according to the predetermined time selected by the user.

Step 110: Adjust the alarm setting and enable the SCI bit. After the predetermined time is selected in Step 100, the OS application relays the information via a driver to the BIOS stored in the first memory 20. The BIOS then adjusts the alarm setting stored in the second memory 32 of the RTC/NVRAM chip 30. In addition, the BIOS enables the SCI (System Control Interrupt) bit stored in the register 42 of the Southbridge chipset 40. Enabling the SCI bit allows the Southbridge chipset 40 to respond a received matching signal when the computer is off.

Step 120: Turn off the computer 10. After having finished with selecting the time, the user can now turn the computer 10 off.

Step 130: Check if the clock time matches the alarm setting. When the computer 10 is off, the time from the clock 34 of the RTC/NVRAM chip 30 will compare the alarm setting stored in the second memory 32 of the RTC/NVRAM chip 30. If there is no match, this step will be repeated. However, if there is a match, the computer 10 proceeds to Step 140.

Step 140: Send a matching signal. Upon detecting a match in Step 130, the value of the $11^{th}$ byte in the second memory 32 will be changed. Changing the value of the $11^{th}$ byte causes the second memory 32 to issue a matching signal to the Southbridge chipset 40.

Step 150: Send a power on signal. Because the SCI bit had been enabled in Step 110, the Southbridge chipset 40 is able to respond to the matching signal from Step 140. Upon receiving the matching signal, the Southbridge chipset 40 issues a power on signal via the SCI pin to the power supply 50 in the computer 10.

Step 160: Start the computer. When the power supply 50 receives a power on signal from the Southbridge chipset 40, the power supply 50 will power all the pins in its connector. The power supply 50 will then check to make sure that the voltages in all the pins are stable before sending a power good signal to the computer 10. Upon receiving the power good signal, the computer 10 will self-start.

To summarize the preferred embodiment of the invention, the invention has a user select a predetermined time using an application of the OS. The application then conveys the selected time to a driver. The driver then communicates the information to the BIOS stored in the first memory 20. The BIOS then adjusts the alarm setting stored in the second memory 32 of the RTC/NVRAM chip 30 according to the selected time. The BIOS also enables the SCI bit stored in the register 42 of the Southbridge chipset 40. Enabling the SCI bit allows the Southbridge chipset 40 to be responsive to signals received when the computer is off.

Next, the user can turn off the computer 10. With the computer 10 off, the computer 10 will compare the time from the clock 34 against the alarm setting stored in second memory 42 (Both the clock 34 and second memory 34 are located on the RTC/NVRAM 30). If there is no match, the computer 10 repeats the comparison until a match is made. When the alarm setting and the time from the clock 34 matches, the value of the $11^{th}$ byte in the second memory 34 is changed. As a result, the second memory 34 will issue a matching signal sent to the South-bridge chipset 40.

Since the SCI bit was enabled earlier, the Southbridge chipset 40 is able to respond to the incoming matching signal by issuing a power on signal to the power supply 50. The power on signal causes the power supply 50 to power up all the pins in its connectors. The power supply 50 will then check if the voltages in all the pins are stable. Upon confirmation of the stability of the voltages, the power supply will issue a power on signal to the computer 10 that will result in the self-start of the computer.

As previously mentioned, there is no current solution that allows a computer to self-start when the computer is off. This ability to self-start is of great utility to a person whenever he or she wants to have an application run when he or she is not present. It gives a further degree of independence and automation to the computer. In contrast to the prior art, the present invention uses a BIOS stored in a first memory to establish a pathway between a second memory and a communications management circuit so that a computer may self-start at a selected time when the computer had been on.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. A method for enabling a computer to self-start comprising:
    selecting a predetermined time for self-start when the computer is on;
    adjusting an alarm setting stored in a memory of an RTC/NVRAM chip (Real-time Clock/Non-Volatile RAM memory chip) according to the predetermined time;
    enabling the System Control Interrupt (SCI) bit in a Southbridge chipset of the computer; wherein the Southbridge chipset responds to a matching signal sent from the RTC/NVRAM chip when the computer is off;
    powering the computer off; and
    enabling the Southbridge chipset for providing electrical power with a power supply if a clock value of the RTC/NVRAM chip matches the alarm setting by:
        sending a power on signal to the power supply via a power supply connector on a motherboard of the computer;
        powering voltages of pins of the power supply connecter to appropriate levels;
        checking if the voltages in the pins of the power supply connector are stable;
        sending a power good signal from the power supply to a processor of the computer; and
        starting the computer upon receiving the power good signal.

2. The method of claim 1 further comprising:
employing a BIOS to enable the SCI bit in the Southbridge chipset.

3. The method of claim 1 further comprising:
sending a matching signal from the RTC/NVRAM chip by changing the value of the $11^{th}$ byte in the memory of the RTC/NVRAM chip.

4. The method of claim 1 further comprising:
activating the SCI pin of a Southbridge chipset in the computer to send a power on signal in response to a match between the clock value of the RTC/NVRAM chip and the alarm setting stored in the memory of the RTC/NVRAM chip.

5. The method in claim 1 wherein selecting the predetermined time further comprises:
using an application of an operating system in the computer to select the predetermined time.

6. The method in claim 5 wherein the application of an operating system employs a driver to relay the selected predetermined time to the BIOS.

7. The method in claim 1 wherein the adjusting of the alarm setting further comprises:
employing a BIOS to adjust the alarm setting in the memory of the RTC/NVRAM chip.

\* \* \* \* \*